United States Patent [19]

Lawrence et al.

[11] Patent Number: 5,231,919
[45] Date of Patent: Aug. 3, 1993

[54] CONVEYOR BELT FOR DOUGH BALL PRESSING APPARATUS

[75] Inventors: Eric C. Lawrence, La Habra; Glenn A. Shelton, Los Angeles, both of Calif.

[73] Assignee: Lawerence Equipment, Inc., El Monte, Calif.

[21] Appl. No.: 961,816

[22] Filed: Oct. 16, 1992

[51] Int. Cl.⁵ ................. A21C 9/08; A21C 11/00; A23P 1/00; A47J 37/00
[52] U.S. Cl. .......................... 99/334; 99/349; 99/353; 100/49; 100/222; 198/341; 198/502.3; 198/810; 198/832.1; 425/167; 425/364 R
[58] Field of Search .................. 99/334–337, 99/372, 373, 377, 379, 386, 443 C, 423, 427, 477; 100/45, 49, 93 P, 222; 198/341, 810, 502.3, 832.1; 425/166, 167, 383, 403.1; 426/502, 517

[56] References Cited

U.S. PATENT DOCUMENTS

| | | | |
|---|---|---|---|
| 3,388,811 | 6/1968 | Kuwayama et al. | 198/341 |
| 3,565,015 | 2/1971 | Jorgensen | 100/222 |
| 3,696,946 | 10/1972 | Hunter et al. | 198/502.3 |
| 3,872,695 | 3/1975 | Busek | 100/222 |
| 4,197,792 | 4/1980 | Mendoza | 99/443 C |
| 4,228,513 | 10/1980 | Doljack | 198/810 |
| 4,318,465 | 3/1982 | Calvert et al. | 198/832.1 |
| 4,668,524 | 5/1987 | Kirkpatrick | 426/502 |
| 4,733,891 | 3/1988 | Cervinka | 198/832.1 |
| 4,905,581 | 3/1990 | Kirkpatrick | 99/353 |
| 4,938,126 | 7/1990 | Rubio et al. | 99/349 |

FOREIGN PATENT DOCUMENTS 0041451  3/1985  Japan ..................... 99/349

Primary Examiner—Timothy F. Simone
Attorney, Agent, or Firm—Lyon & Lyon

[57] ABSTRACT

An improvement in a dough ball pressing apparatus in which the continuous conveyor belt is provided with metal strips at predetermined spaced locations along each edge of the conveyor belt and a pair of proximity switches are positioned on the apparatus adjacent the edges of the conveyor belt for detecting the metal strips. The proximity switches cause the belt driving mechanism to stop upon detecting a metal strip for precisely locating the belt and controlling the distance of travel in each cycle. The conveyor belt is provided as a flat length with ends that are realeasably connected by a pin for allowing easy installation of the belt without disassembling the belt drive mechanism.

14 Claims, 2 Drawing Sheets

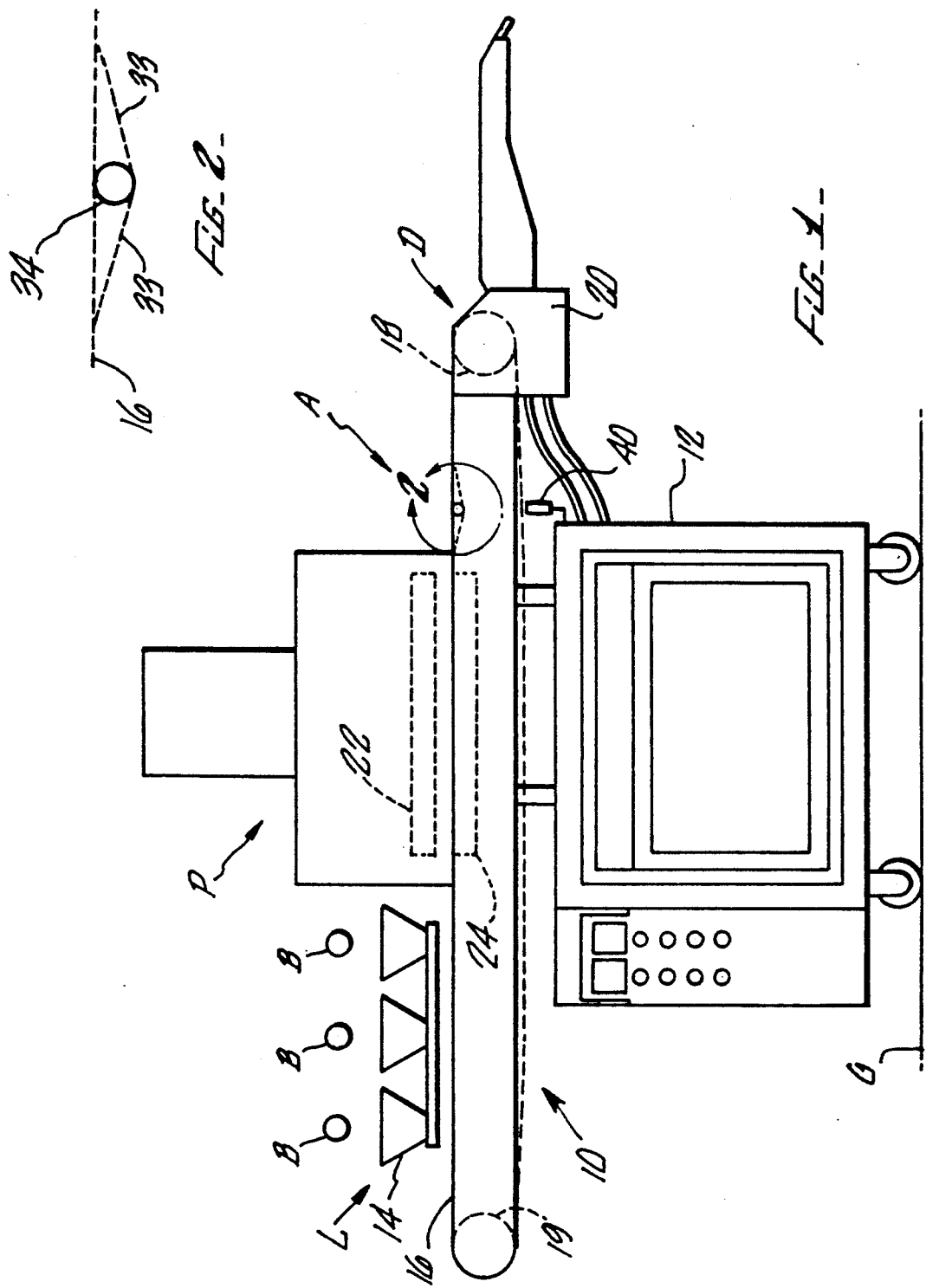

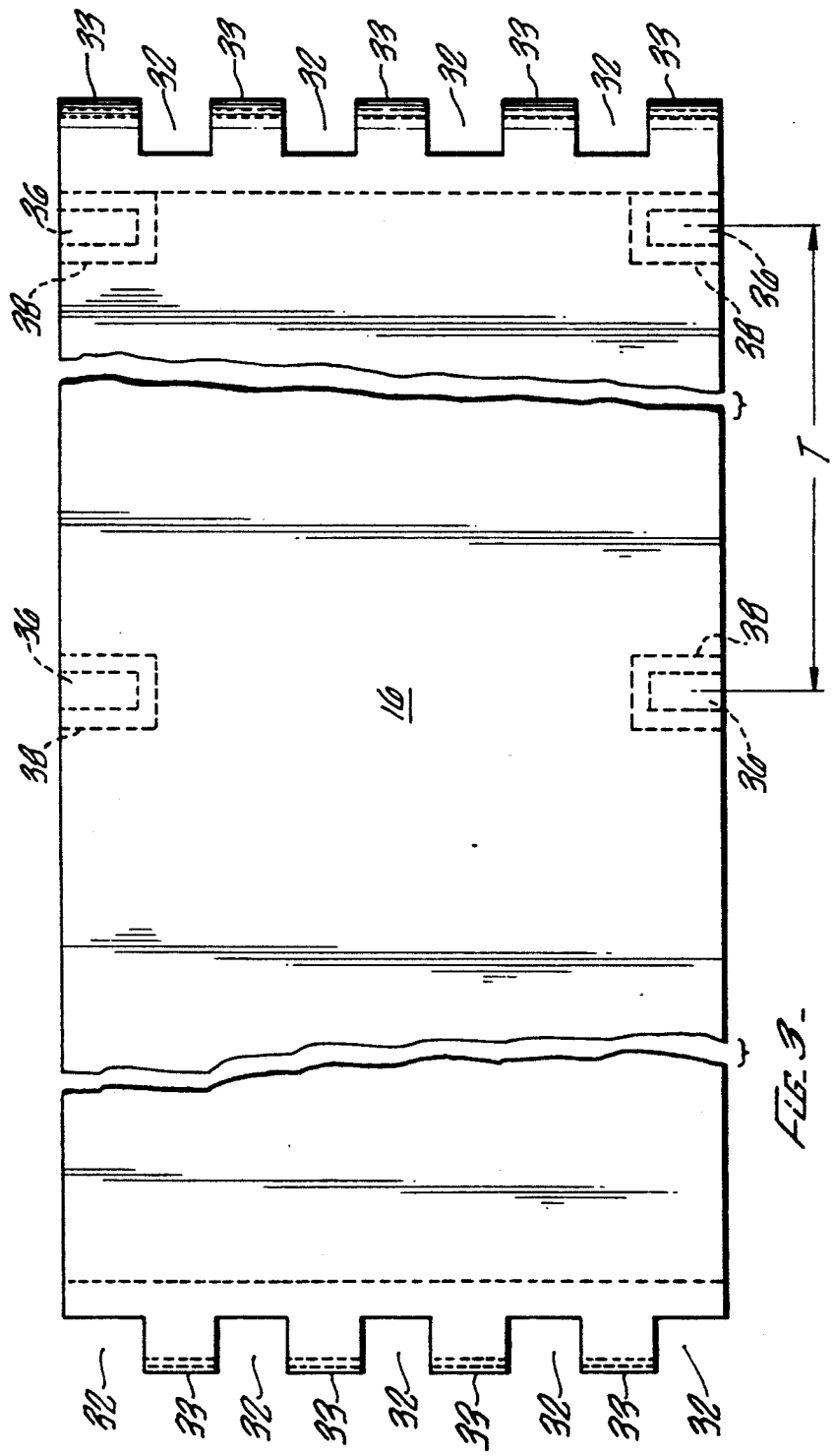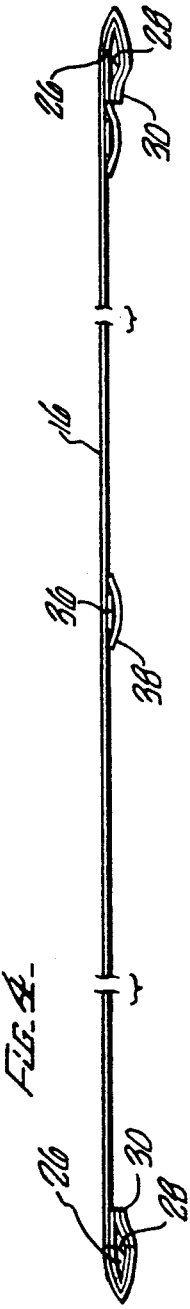

CONVEYOR BELT FOR DOUGH BALL PRESSING APPARATUS

This invention relates to a dough ball pressing apparatus, such as a flour tortilla making machine, and in particular is directed to an improved conveyor belt capable of accurate intermittent movement on such apparatus.

There are dough ball pressing machines that employ a continuous flat conveyor belt that is intermittently advanced by the machine and stopped for pressing the dough balls placed on the belt, such as shown and described in U.S. Pat. No. 4,668,524, the disclosure of which is incorporated herein by reference as though set forth in full. In such prior art dough ball pressing machines, a flat continuous conveyor belt of reinforced Teflon or coated with Teflon is mounted on rollers to be driven horizontally through the machine with an intermittent motion. When the conveyor belt is stopped, a plurality of dough balls are placed on the conveyor belt in a predetermined pattern at a loading station and the previously placed pattern of dough balls that have been advanced from the loading station to a pressing station between the upper and lower platens of a press are pressed to the desired thickness by downward movement of the upper platen. One or both of the platens are heated for parbaking the dough to the circular shape and thickness of a flour tortilla. The upper platen of the press is raised and the conveyor belt advances the tortilla shaped dough out from under the press and new dough balls are brought to a position within the press for repeating the pressing and parbaking cycle.

In one form of such prior art apparatus, the drive roller for a plain conveyor belt is rotated a predetermined number of revolutions to cause the desired distance of movement of the conveyor belt to properly position each set of dough balls within the press from their previous position in the loading section. However, if the conveyor belt slips relative to the drive roller, then the belt and dough balls do not advance a sufficient distance and the dough balls are improperly compressed by the press, as well as the next set of dough balls being positioned too close to or on top of some of the dough balls of the previous set of dough balls. Various attempts have been made to avoid the undesirable slippage between the drive roller and the conveyor belt, such as increasing the tension or providing a rough surface on the drive roller, but such attempts are only temporarily or marginally successful and often induce premature wearing of the conveyor belt. Moreover, the potential slipping between the conveyor belt and the drive roller dictates the need to use a conveyor belt formed as a continuous loop without a noticeable seam or connection along its length because such seam or connection may eventually become positioned within the press and cause tortillas to be pressed to an irregular shape and thickness or to even cause damage to the press. However, a continuous conveyor belt requires disassembly of the conveyor drive system for removal of a worn belt and installation of a new belt which can be very time consuming and result in improper reassembly or adjustment resulting in further damage or wear.

Another attempt to prevent the slippage of the conveyor belt with respect to the drive roller in dough ball pressing machines of this type has been to use chain drives attached to one or both edges of the conveyor belt with a sprocket or sprockets on the drive roller engaging the chain drive to cause positive movement of the conveyor belt for the desired distance by a predetermined number of revolutions of the drive roller. However, such chain driven conveyor belts are both expensive and time consuming to install.

Other attempts to accurately stop a conveyor belt at a desired location have included electric eye devices for sensing the product being transported by the belt or a mark on or hole in the belt, but such devices and methods have not been completely successful in the food processing industry for various reasons. For example, the transported product tends to be irregular thereby causing imperfect detection. Also, conveyor belts in the food industry must be cleaned regularly to very stringent standards whereby visible marks may fade or become irregular, holes or the like may accumulate food particles which is unacceptable, and Teflon-coated belts may become darkened to thereby obscure any marks.

Thus, it is an object of the present invention to provide an improved form of conveyor belt that avoids the aforementioned problems and other problems that exist with respect to dough ball pressing machines of this type. Specifically, it is an object of this invention to provide an improved conveyor belt having means affixed along its length at predetermined intervals that are detected by means on the dough ball pressing machine for controlling the distance that the conveyor belt is advanced by a drive roller without regard to the number of revolutions of the drive roller. It is a further object of this invention to provide such an improved conveyor belt in which metal strips are installed along each edge of the conveyor belt at predetermined distances for being detected by a proximity switch which is mounted on the dough ball pressing machine, which proximity switch controls the conveyor drive roller. A still further object of this invention is to provide an improved conveyor belt of this type wherein the two ends of the conveyor belt may be releasably connected for easy installation and removal of the conveyor belt from the dough ball pressing machine.

Further objects and advantages of this invention will appear from the description thereof and the accompanying drawings, wherein:

FIG. 1 is a side elevation view of a dough ball pressing machine with the improved conveyor belt and belt movement control system of this invention;

FIG. 2 is an enlarged elevation view of the portion of the conveyor belt shown in the circle A of FIG. 1 and illustrating the connection of the two ends of the conveyor belt;

FIG. 3 is a plan view of the conveyor belt of this invention removed from the dough ball pressing machine and laying flat, with portions broken away to reduce its length for illustration purposes; and FIG. 4 is a side elevation view of the conveyor belt illustrated in FIG. 3.

Referring to FIG. 1, a dough ball pressing apparatus, generally designated 10, of the type on which the improved conveyor belt and system of this invention may be used is illustrated but it is to be understood and will readily appear to those skilled in the art that the present invention can be used on a variety of different apparatus without departing from this invention. The apparatus 10 includes a support housing 12 that supports the apparatus 10 on the ground G and contains many of the operating components and controls (not shown) for the apparatus. The apparatus 10 includes a loading station, generally designated L, a pressing station, generally designated P, and a discharge station, generally designated D for loading, pressing and discharging, respectively, the dough balls that are being processed by the apparatus 10. The dough balls B, three of which are diagrammatically shown in the loading station L, drop through separate funnels 14 onto the conveyor belt 16 for properly positioning the dough balls B on the conveyor belt. The apparatus 10 may be of a width to accommodate plural rows of dough balls B and more or less than the three in a row shown. A device of the type disclosed in the aforementioned U.S. Pat. No. 4,668,524 may be included in apparatus 10 for partially compressing the dough balls B onto the conveyor belt 16 while the belt is stopped for preventing any rolling movement of the dough balls B when the conveyor belt 16 is advanced to the pressing station P or, in the alternative, the dough balls B may be handloaded onto the conveyor belt 16 in the proper position and condition for the conveyor belt movement.

The conveyor belt 16 is then advanced a predetermined distance by drive roller 18 which is rotated by drive mechanism 20 for a predetermined number of revolutions to cause the desired distance of movement of the conveyor belt to bring the dough balls B into proper position within the pressing station P. When the conveyor belt 16 is stopped by stoppage of the drive roller 18, the upper platen 22 of the pressing station P is moved downwardly with an appropriate force and spacing from the lower platen 24 of the pressing station P for squeezing the dough balls B to the desired thickness and shape. One or both of the platens 22 and 24 are heated for causing parbaking of the dough balls to maintain their flattened condition and proper texture. The upper platen 22 is raised and the conveyor belt 16 is again advanced by the drive roller 18 to move the flattened dough balls from the pressing station P to the discharge station D and advance new dough balls B from the loading station L to the pressing station P for repeating the cycle. As thus far described, the apparatus 10 and its operation is relatively conventional and is described in the aforementioned U.S. Pat. No. 4,668,524.

Referring now to FIGS. 3 and 4, a conveyor belt embodying the features of this invention is illustrated and identified by the numeral 16. The conveyor belt 16 is of substantial length for forming a continuous loop in the apparatus 10 around the drive roller 18 and driven roller 19. The belt 16 may be of any desired construction and materials, and a Teflon coated fiberglass belt of 10 or 11 ml. thickness (0.010 or 0.011 inches) is preferred. Each end of the belt 16 is folded over to form a loop 26 and preferably a length of tear resistant fiberglass belt material 28 is folded inside of the loop 26 for reinforcing, which material may be of approximately 10 ml. thickness. The loops of belt 16 and material 18 are then affixed to each other at the end 30 to form the opening of loop 26, as best shown in FIG. 4. Portions of the loop ends are then cut from each end of the belt in staggered relationship to leave loop shaped tabs 33 and openings 32 therebetween whereby each loop shaped tab 33 from one end of belt 16 fits in a space 32 between loop shaped tabs 33 of the other end of the belt 16 when the belt is folded into a continuous loop, such as for installing on the apparatus 10. As diagrammatically shown in FIG. 2, the overlapping loops 33 on both ends of the belt 16 are releasably joined by a laterally extending pin 34 which it has been found can be as small as 0.094 inches in diameter of mild steel, whereby it does not create a significant obstruction or stretching of the belt as it passes over the rollers 18 and 19. The pin 34 can easily be removed by sliding it laterally of the belt for disconnecting the ends of the belt 16 and removing the belt 16 from the apparatus 10 without disassembling any of the belt drive mechanism and a new belt can be installed in the same manner.

The belt 16 is provided with a plurality of pairs of metal strips 36 spaced along the length of the belt with a metal strip 36 of each pair positioned at each of the opposite edges of the belt. Metal strips 36 are fixed to the inside of the belt 16, as it is positioned on the apparatus 10, and a patch 38 of Teflon coated fiberglass belt material surrounds each metal strip 36 and is affixed to the belt 16 for permanently attaching the metal strip to the belt. The patches 38 may be affixed in any convenient manner such as heat sealing, stitching, solvent or adhesive.

In the preferred embodiment, the pairs of metal strips are spaced along the length of belt 16 at a predetermined distance T equal to the desired distance of travel of the belt 16 between the stations L, P and D during each cycle of the operation of the machine. Moreover, the length of belt 16, when joined to complete the continuous loop by pin 34 is selected to be a multiple of the distance T so that a full revolution of the belt 16 and the apparatus 10 will be equaled to that multiple of the distances T. It is also contemplated that numerous metal strips 36 can be mounted at much shorter distances than distance T and detecting, as described below, thereof can be used to measure the distance T in multiples of those intervals.

A detecting means 40, such as a pair of proximity switches, is provided on the apparatus 10 adjacent any desired portion of the travel of the belt 16 adjacent the edge of the belt 16 for detecting the presence of the metal strips 36. A detecting means 40 is connected to the drive control (not shown) for the drive means 20 that rotates the drive roller 18 for driving the belt 16, and the detecting means 40 functions to stop the drive roller drive means 20 upon the detection of a metal strip 36. Thus, the conveyor belt 16 is advanced precisely a distance T for each cycle of the press station P regardless of any slippage of the belt 16 with respect to the drive roller 18 because the drive roller 18 is not stopped until the detecting means 40 detects the proximity of a metal strip 36. As a result, the conveyor belt 16 need not be excessively tensioned to attempt to avoid slippage, and the drive roller 18 need not be provided with a surface that will avoid slippage, which may cause premature wear. Moreover, the belt 16 can be easily removed and replaced on the apparatus 10 by releasing and installing the pin 34 and yet there is no risk of the pin 34 and the ends of the belt 16 joined thereby being positioned between the pressing platens 22 and 24 because the positions of the metal strips 36 are selected to always locate the belt ends spaced from the press platens.

Although various embodiments of the cooperating metal strips 36 and detecting means 40 may be used for performing the above described functions of accurately detecting and stopping the movement of the conveyor belt 16, one successful combination thereof is to provide metal strips of cold rolled steel of 0.005 inches thickness by 0.50 inches wide by 2.50 inches long and a proximity switch manufactured and sold under the brand name "Micro Switch", part number 923AB3BM-A7T-L. Also, it is preferred to use the metal strips 36 in pairs with one strip on each edge of the belt 16, and to provide two separate proximity switches operating in parallel to assure that at least one switch detects the presence of a strip 36. Other means that can be affixed or formed along spaced locations of a conveyor belt and detected by other detecting means will readily appear to those skilled in the art as equivalent to the above-described means and are included within the scope of this invention as defined by the accompanying claims.

What is claimed is:

1. An improvement in a conveyor belt for a dough ball pressing apparatus having a continuous conveyor belt driven intermittently by a drive roller for intermittent movement of the belt to allow the dough balls to be pressed while the belt is stopped and to advance the pressed dough balls through the apparatus by movement of the belt, wherein detecting means are provided on the apparatus adjacent the conveyor belt, the improvement comprising, the conveyor belt having two ends with means for releasably connecting said ends to form the continuous conveyor belt on the apparatus, and said belt having a plurality of separate detectable means attached to the belt and spaced along the belt at predetermined distances for being detected by the detecting means on the apparatus for causing stopping of the drive roller after each movement of the belt for a preselected distance.

2. The improvement of claim 1, wherein said detectable means are provided along each edge of the belt.

3. The improvement of claim 1, wherein said detectable means are metal strips attached to one surface of the belt.

4. The improvement of claim 1, wherein said belt is Teflon-coated fiberglass.

5. The improvement of claim 1, wherein said belt has two ends with each end having spaced loop portions for fitting between the spaced loop portions on the other end of the belt for releasably connecting said two ends with pin means passed through said loop portions.

6. An improvement in a conveyor belt for a dough ball pressing apparatus having a continuous conveyor belt driven intermittently by a drive roller for intermittent movement of the belt to allow the dough balls to be pressed while the belt is stopped and to advance the pressed dough balls through the apparatus by movement of the belt, the improvement comprising, a conveyor belt having two ends with each end having laterally spaced and offset loop portions for fitting between the spaced loop, portions of the other end of the belt, a pin for extending through said loop portions of both said ends for releasably connecting said ends to form the continuous conveyor belt on the apparatus, a plurality of pairs of flat metal strips attached to a surface of said belt that faces inside when the ends of said belt are connected to form said continuous conveyor belt, each said flat metal strip of each said pair being located along opposite edges of said belt, and each pair of flat metal strips is spaced along the belt at predetermined distances for being detected by detecting means on the apparatus for causing stopping of the drive roller after each movement of the belt for said predetermined distance.

7. The improvement of claim 6, wherein said belt is Teflon-coated fiberglass.

8. The improvement of claim 7, wherein said loop portions are formed by doubling over the end portions of the belt and affixing said end portions to the belt.

9. The improvement of claim 8, wherein a layer of tear-resistant fiberglass is positioned inside each said loop portion s on the apparatus for causing stopping of the drive roller after each movement of the belt for said predetermined distance.

7. The improvement of claim 6, wherein said belt is Teflon-coated fiberglass.

8. The improvement of claim 7, wherein said loop portions are formed by doubling over the end portions of the belt and affixing said end portions to the belt.

9. The improvement of claim 8, wherein a layer of tear-resistant fiberglass is positioned inside each said loop portion and affixed to the belt.

10. The improvement of claim 7, wherein each said metal strip is attached to said belt by a patch of Teflon-coated fiberglass completely covering the metal strip and adhered to the belt.

11. An improvement in a dough ball pressing apparatus having a continuous conveyor belt driven intermittently by a drive roller for intermittent movement of the belt to allow the dough balls to be pressed while the belt is stopped and to advance the pressed dough balls through the apparatus by movement of the belt, the improvement comprising, a conveyor belt having two ends with each end having laterally spaced and offset loop portions for fitting between the spaced loop portions of the other end of the belt, a pin for extending through said loop portions of both said ends for releasably connecting said ends to form the continuous conveyor belt on the apparatus, a plurality of pairs of flat metal strips attached to a surface of said belt that faces inside when the ends of said belt are connected to form said continuous conveyor belt, each said flat metal strip of each said pair being located along opposite edges of said belt and each pair of said flat metal strips being spaced along the belt at predetermined distances, detecting means mounted on the apparatus adjacent an edge of the conveyor belt for detecting each said metal strip along that edge, and means for causing stopping of the drive roller in response to said detecting means detecting a said metal strip after each movement of the belt for said predetermined distance.

12. The improvement of claim 11, wherein said belt is Teflon-coated fiberglass.

13. The improvement of claim 11, wherein said detecting means comprises a proximity switch.

14. The improvement of claim 11, wherein a separate said proximity switch is located adjacent each edge of the belt.

* * * * *